Sept. 26, 1933.     F. M. ROBERTS     1,928,464
CONTROL SYSTEM
Filed Jan. 2, 1932

Inventor:
Frederic M. Roberts,
by Charles E. Tullar
His Attorney.

Patented Sept. 26, 1933

1,928,464

UNITED STATES PATENT OFFICE 1,928,464

CONTROL SYSTEM

Frederic M. Roberts, Schenectady, N. Y., assignor to General Electric Company, a corporation of New York Application January 2, 1932. Serial No. 584,334

6 Claims. (Cl. 172—293)

My invention relates to motor control systems, more particularly to the control of an electric motor arranged to drive the reel of a paper making machine, and has for an object the provision of a simple and reliable system for varying the speed of the reel as its diameter is increased.

It is well understood that as a strip is wound upon a reel the speed at which the reel is driven must be varied as the diameter of the reel increases if the paper is to be wound upon the reel with a constant tension. Heretofore, the reel motor has been driven through a slip-belt drive, that is to say, as the diameter of the roll increased the motor was allowed to slip with respect to the reel so that the speed of the reel decreased as the tension increased. Obviously, this is an inefficient and uneconomical way of accomplishing the required results.

In carrying out my invention in one form thereof, I provide for constantly varying the speed of the reel driving motor as the diameter of the reel increases and, in case the strip of paper is broken, I provide for the control of the reel motor so that its speed remains substantially the same as it was when the breakage occurred.

Figure 1:
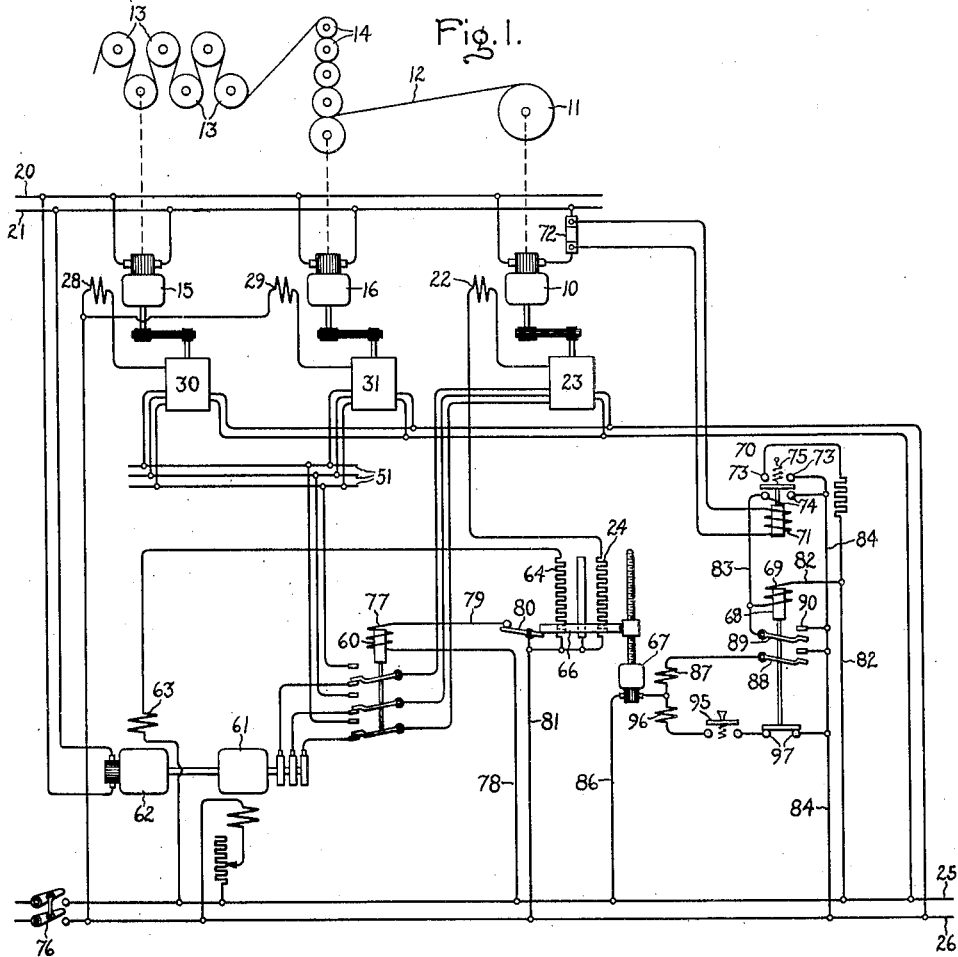
Figure 2:
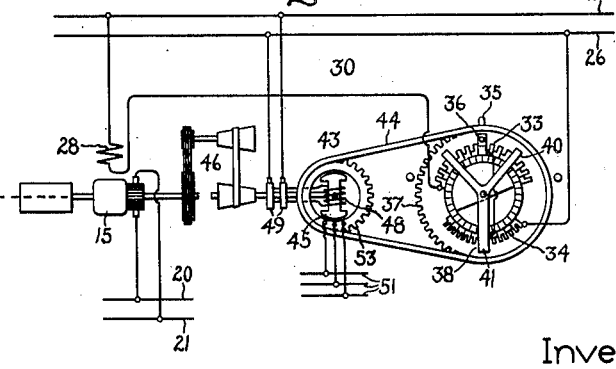

For a more complete understanding of my invention, reference should now be had to the accompanying drawing, in which Fig. 1 shows a diagrammatic representation of a paper making machine, together with a motor control system embodying my invention. Fig. 2 is a schematic illustration of one of the speed regulators used in the control system of Fig. 1.

Referring now to Fig. 1, I have shown my invention in one form as applied to a reel driving motor 10 arranged to drive a reel 11, upon which a strip of paper 12 is to be wound. The strip of paper 12 is received by the reel 11 from the drying rolls 13 and the calender rolls 14. The motors 15 and 16 are respectively provided for the dryer rolls 13 and the calender rolls 14. Each of the respective armatures of these motors is connected to the supply lines 20 and 21 which are energized from a suitable direct current source of supply (not shown). A field winding 22 provided on the reel motor 10 is connected through a speed regulator 23 and a resistance 24 to the direct current supply lines 25 and 26, which are also energized from a suitable source of direct current supply (not shown). The field windings 28 and 29 provided respectively on the motors 15 and 16 are connected through their respective speed regulators 30 and 31 to the direct current supply lines 25 and 26. The resistance type speed regulators 23, 30 and 31 are similarly constructed and I have shown in Fig. 2 a typical regulator, for example the speed regulator 30, and it will be understood that the other speed regulators 23 and 31 are in all respects identical with it.

This speed regulator forms no part of the present invention as it is fully described and claimed in United States Patent 1,655,663, Rogers et al., assigned to the same assignee as the present invention. Therefore, in the present description, this regulator will be briefly described by observing that the field 28 of the motor 15 is connected through the resistances 33 and 34 across the direct current supply lines 25 and 26. The resistance 33 is provided for giving a fine regulating effect, while the resistance 34 is for coarse regulation. The effective number of the resistance sections 33 may be varied by means of a brush 35, which is mechanically connected to a gear wheel 37 by a pin 36. A brush 38 is carried by the lower end 41 of a Y-shaped member 40 so that the resistance sections included in the "coarse" adjustment resistance 34 may be varied. The Y-shaped member 40 is pivotally supported at its midpoint with its upwardly extending arms arranged to be engaged by the movement of the brush 35 beyond the limit determined by the opening of the Y. The gear wheel 37 is arranged to be driven by a dynamometer 43 by means of an endless chain 44. This dynamometer is provided with a rotatable inducing member 45 arranged to be driven through a cone and belt arrangement 46 from the motor 15. The inducing winding 48 on the rotatable member 45 is connected by means of slip rings 49 to the direct current supply lines 25 and 26. A distributed three-phase winding, which is not shown in the drawing, but is merely included as being supplied with current from a suitable source of alternating current supply is indicated by the supply lines 51.

It will be understood that if there is an angular disagreement between the rotating field produced by the three-phase winding and the rotating core member 45, there will be a movement of the gear 53 by which the endless chain 44 is driven so that the brush 35 will be rotated in one direction or the other as determined by the direction of the angular disagreement. For example, if the motor 15 should have its speed decreased, there will at once appear an angular disagreement between the rotating core 45 and the rotating field produced by the winding with the result that the gear 53 will be rotated in a direction to increase the amount of resistance connected in circuit with the motor field winding 28 so that the motor at once increases its speed. If the reduction in speed is considerable the brush 35 will be rotated into engagement with one or the other of the upper arms of the Y-shaped members rotating the Y-shaped member 40 about its pivot point so that the brush 38 carried thereby will be moved in a direction to include one or more of the "coarse" resistance sections of the resistance 34.

It will therefore be observed that the desired speed ratio between the motors 15, 16 and 10 may be determined by merely shifting the belts of the variable speed drive of each of the respective regulators 23, 30 and 31. The speed relation desired between the motors will then be automatically maintained, inasmuch as the speed of each of the separate driving motors 10, 15 and 16 is being constantly compared with reference to the frequency of the alternating current supply 51, since corresponding elements of the dynamometer are connected to this common alternating current supply circuit. It will of course be understood that this particular type of regulator is not essential to my invention. Any one of the several electrical differential type regulators known to the art are suitable for this application.

Continuing with the explanation of my invention, it will be observed that the speed regulator 23 is connected through a switch 60 with the alternating current supply lines 51. When this switch is in its lower position, however, it serves to connect the distributed winding of the regulator 23 to a three-phase alternating current generator 61. This generator is driven by a direct current motor 62 provided with a separately excited field winding 63. This field winding is connected through the resistance 64 across the direct current supply lines 25 and 26. It will be observed that a bridging member 66 is arranged to be driven by a direct current motor 67 so as to vary the values of the resistances 24 and 64, respectively connected in the circuit of the field winding 22 of the motor 10 and in the field winding circuit of the motor 62. The motor 67 is arranged to be energized whenever the contactor 68 is operated to its closed position. The contactor operating coil 69 is arranged to be energized whenever a relay 70 having its operating coil 71 connected across a shunt 72 in series with the armature circuit of motor 10 has sufficient voltage produced across it. It will be observed that this relay 70 is provided with the upper contacts 73 and the lower contacts 74 which serve to control the operation of the contactor 68.

With the above understanding of the elements and their organization with respect to each other in the system, the operation of the system itself and the manner in which the motor 10 is controlled to maintain constant tension on the strip of paper 12, as well as to maintain the speed of the reel 11 constant in case of breakage of the strip, will be readily understood from the description which follows: It will be assumed that the reel 11 is empty and that the strip of paper 12 has been threaded upon it.

It will also be assumed that the line switch 76 is closed and that the supply lines 25—26 and 20—21 are suitably energized from a direct current source of supply and that the supply lines 51 are suitably energized from a three-phase source of alternating current. It will at once be observed that a circuit is completed for the operating coil 77 of the contactor 60 which circuit may be traced from the supply line 25, by conductor 78, operating coil 77, conductor 79, a switch 80 which is held closed by the bridging member 66, and by conductor 81 to the other supply line 26. The contactor 60 is immediately operated to its upper position to connect the three-phase winding (not shown) of the speed regulator 23 to the alternating current supply lines 51. As I have explained above, the speed regulators 23, 30 and 31 function to cause the motors 10, 15 and 16 to rotate with a predetermined speed relation between them. It is particularly advantageous to connect the electrical differential speed regulator 23 with the three-phase alternating current supply lines 51 at the moment of starting the paper on the reel 11 in order that the reel 11 may be driven with a predetermined speed relation with respect to the drive of the calender rolls 14.

For a predetermined normal load on the motor 10, the potential drop across the shunt 72 is just sufficient to cause the relay 70 to open against the bias of the spring 75 its contacts 73.

As soon as the diameter of the reel 11 increases by the winding of the paper upon it, a greater load is thrown upon the motor 10 and the resulting increase of current through the shunt 72 causes the relay 71 to be energized to close its contacts 74. The closing of these contacts completes an energizing circuit for the operating coil 69 of the contactor 68. This circuit may be traced from the supply line 25, by conductor 82, operating coil 69, conductor 83, contacts 74 and by conductor 84 to the other supply line 26. The contactor 68 is thereupon operated to its closed position to complete a circuit for the rheostat operating motor 67. This circuit may be traced from the supply line 25 by conductor 86, armature of the motor 67, series field 87 of this motor, lower contacts 88 of contactor 68, and by conductor 84 to the other supply line 26. The motor 67 thereupon rotates in a direction to move the bridging member across the resistances 24 and 64. As soon as the bridging member 66 has progressed a short distance, it will be observed that it disengages itself from the switch 80 which switch is operated to its open position deenergizing the operating coil 77 of the contactor 60. Consequently the contactor 60 is operated to connect the speed regulator 23 with the alternating current generator 61.

The effect of moving the bridging member 66 across the resistances 24 and 64 is to decrease the amount of resistances connected in the respective field windings 22 and 63 of the direct current motors 10 and 62. The result is a decrease in speed on both of these motors. The result of decreasing the speed of motor 10 is to decrease its current and therefore the relay 70 is operated to open its contacts 74. However, when the contactor 68 closed a holding circuit was completed for its operating coil 69 which circuit may be traced from the supply line 25, conductor 82, operating coil 69, upper contact 90 of the contactor 68, and by conductor 84 to the other supply line 26. When the current of motor 10 is reduced below its predetermined normal value, however, the spring 75 serves to actuate the relay 70 to close its contacts 73. This completes a short circuit around the operating coil 69 of the contactor 68 so that this contactor is operated to its open position, deenergizing the series motor 67 driving the bridging arm 66.

The effect of decreasing the speed of the motor 62 is to decrease the speed of the alternating current generator 61 and hence its frequency, so that the speed regulator 23 tends to maintain the speed of the motor 10 at the new low value of frequency fixed by the generator 61. Ordinarily the speed of the motor 67 may be adjusted so that the resistances 24 and 64 are included in the circuit and adjusted to the rate required to decrease the speed of the reel 11 as its radius increases. Should the strip of paper 12 break, the motor 10 will quickly accelerate, while its armature current will be immediately decreased. As I have explained, however, the effect of decreasing the armature current below its normal value permits the spring 75 to close the contacts 73 of the relay 70, which deenergizes the contactor 68 and hence the motor 67. The result is that the generator 61 will be producing a voltage at a frequency which will remain constant. The regulator 23 will begin to function to maintain the speed of the motor 10 constant as compared with the fixed frequency of generator 61, and inasmuch as there is a "coarse" resistance and a "fine" resistance by which the speed regulator 23 may increase the field current of 22, it will be observed that the speed regulator 23 will have a sufficient range to maintain the speed of the motor 10 constant. The speed of this motor will be substantially the same as its speed was at the instant the strip 12 was broken. This forms an important feature of my invention, inasmuch as the speed at which the reel 11 should be rotating when the paper 12 is again threaded upon the reel is automatically determined. If this were not done, considerable difficulty would be experienced in the endeavor to thread the paper 12 upon the reel 11, inasmuch as only a rough approximation of the desired speed of the reel 11 could be obtained by the manual adjustment of the speed of motor 10.

After the motor 67 has driven the conducting member 66 to its outer limit of travel, or to the position with the resistances 24 and 64 connected in circuit with the respective field windings 22 and 63 short circuited, the reel 11 will be driven at very low speed. This speed will approach the speed desired for a full reel of paper. A pushbutton switch 95 is arranged so that a circuit may thereby be completed for a field winding 96 provided on the motor 67. This field winding is arranged to produce excitation on the motor armature in a direction to cause the motor to return the conducting member to its original position with the switch 80 closed. The reverse operation cannot take place, however, as long as the contactor 90 is closed by reason of a pair of normally closed contacts 97 connected in series with the push button switch 95 and the field winding 96.

While I have shown a particular embodiment of my invention, it will be understood of course, that I do not wish to be limited thereto, since many modifications may be made, and I therefore contemplate by the appended claims to cover any such modifications as fall within the true spirit and scope of my invention.

What I claim as new and desire to secure by Letters Patent of the United States, is:

1. A control system for paper reels and the like, comprising a reel driving motor, a speed regulator of the electrical differential type for controlling the speed of said motor, generating means for supplying a voltage of varying frequency to said speed regulator, a variable speed motor for driving said generating means, and means responsive to an electrical condition of said motor for progressively decreasing the speed of said reel motor and of said generator.

2. A control system for paper reels and the like comprising a reel motor, a speed regulator of the dynamometer type arranged to regulate the speed of the reel motor, a generator arranged to supply alternating current to said speed regulator, a driving motor for said generator, means responsive to a predetermined increase of current of said reel motor for progressively decreasing the speed of said reel motor and said driving motor, the said means being thereafter responsive to a predetermined reduction of current of said reel motor for stopping the diminution of speed of said reel motor and of said driving motor.

3. A control system for a paper reel driving motor, comprising a speed regulator having a three-phase distributed winding arranged to be connected to a three-phase alternating current generator, a field circuit for said motor, and an inducing winding arranged to be driven by said motor, the said regulator serving to introduce resistance in said field circuit of said motor whenever the speed of said inducing member varies from the rotating field produced by said alternating current generator, a motor for driving said alternating current generator, a pair of resistances each of which is connected in series with the respective field windings on said motors, and means responsive to a predetermined increase in load current on said reel motor for decreasing the resistance connected in said field circuit so that the field current of said reel motor is directly increased by said resistance and further varied by the functioning of said speed regulator.

4. A motor control system for paper reels and the like, including a reel motor, a field winding therefor, an alternating current generator, a generator driving motor, a speed regulator for varying the excitation of said reel motor field excitation in accordance with the frequency of said alternating current generator, a motor operated rheostat connected in series with said field winding of said reel motor and in series with the field winding of said generator driving motor, means responsive to a predetermined load on said reel motor for operating said motor rheostat to increase progressively the field current in each of the said respective motor field windings, and means responsive to a predetermined reduction in load for deenergizing said motor operated rheostat so that said speed regulator fuctions to maintain the speed of said reel motor at the speed when said predetermined reduction in load occurred.

5. A system for controlling the speed of electric motors wherein a plurality of motors are arranged to be operated at different speeds and at constant but adjustable ratios, a source of alternating current having a predetermined frequency normally connected to said motors, an alternating current generator arranged to be operated over a predetermined range of speed and frequency, speed controlling means operable in response to the load current of one of said motors for simultaneously varying the speeds of said motor and said generator, and switching means operated by said speed varying means for disconnecting said motor from said source of supply and for connecting said motor to said generator.

6. A control system for a motor arranged to drive a paper reel or the like comprising a motor for driving said reel, speed controlling means for progressively decreasing the speed of said motor, means responsive to a predetermined variation in an electrical condition of said motor for interrupting the operation of said speed controlling means, and regulating means for maintaining the speed of said motor at the speed at which said predetermined variation of said condition occurs.

FREDERIC M. ROBERTS.